(No Model.)
P. H. BROWN.
DEVICE FOR FELLING TREES.
No. 468,384. Patented Feb. 9, 1892.
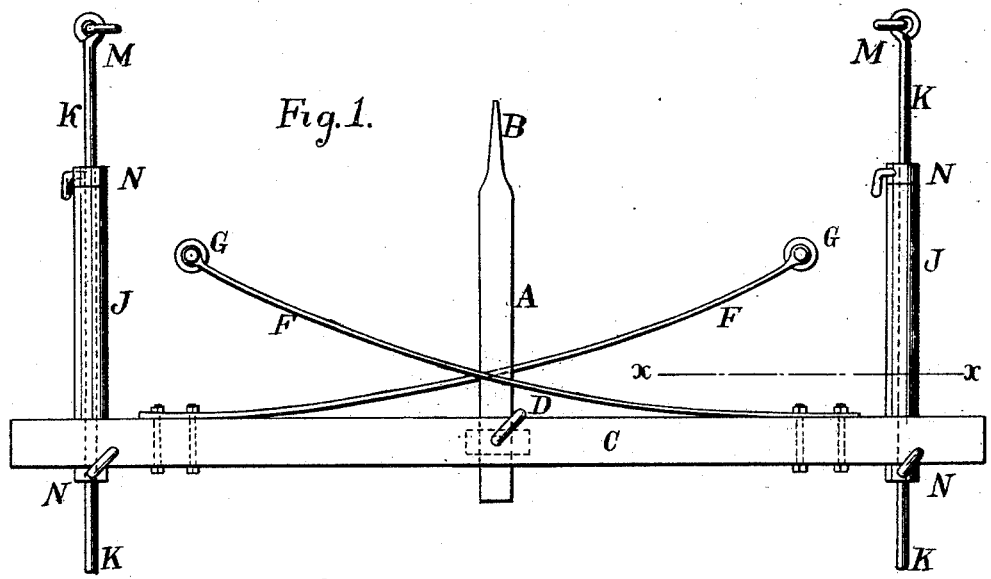
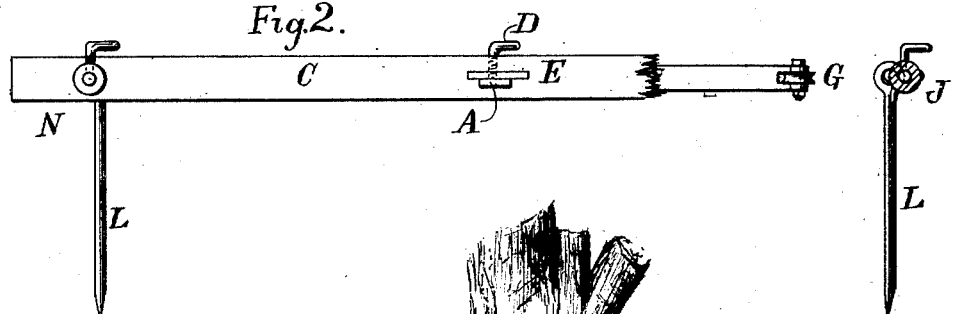
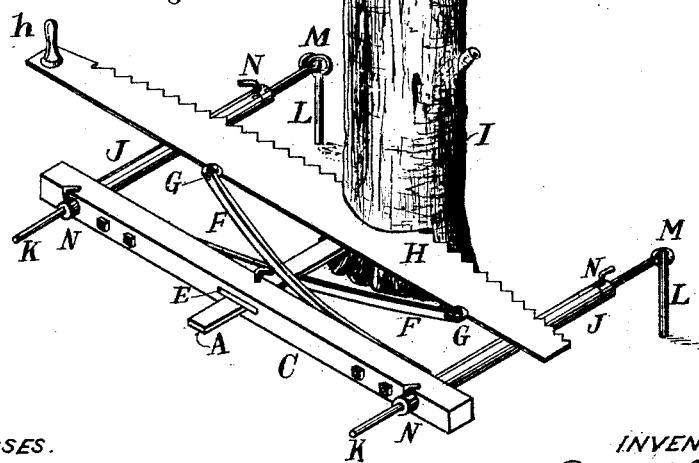
WITNESSES.
O. W. Eklund.
E. Anderson.
INVENTOR.
Percy H. Brown
By A. M. Carlsen
ATTORNEY.

UNITED STATES PATENT OFFICE.

PERCY HULL BROWN, OF VESUVIUS BAY, BRITISH COLUMBIA, CANADA.

DEVICE FOR FELLING TREES.

SPECIFICATION forming part of Letters Patent No. 468,384, dated February 9, 1892.

Application filed December 26, 1890. Serial No. 375,789. (No model.)

*To all whom it may concern:*

Be it known that I, PERCY HULL BROWN, a citizen of Canada, residing at Vesuvius Bay, Salt Spring Island, British Columbia, Canada, have invented certain new and useful Improvements in Devices for Felling Trees; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide a simple, practical, portable device, by the employment of which a crosscut-saw of ordinary form may be readily operated by one man, and the device being adjustable, trees of any ordinary size may be sawed off near the surface of the ground.

With this object in view the invention consists in the novel construction and combination of the several parts, as will be hereinafter fully described, and pointed out in the claims.

In the accompanying drawings, forming a part of this specification, Figure 1 is a top plan view of the portable frame on which the crosscut-saw is placed when in use to cut through the body of a tree. Fig. 2 is a side elevation of the frame, as shown in Fig. 1, with a portion of it shown in section on the line X X. Fig. 3 is a perspective view showing the device in position, secured and adjusted, with the saw on it, to the ground and to the trunk of the tree ready for sawing off the tree.

In the drawings, A represents a steel or iron bar, preferably flat, with a sharp point B for driving into the trunk of the tree to be felled. Upon this metallic spike-bar A is movably fitted the wooden bracket-bar C, which is held at any desired place upon the spike-bar by the thumb-screw D, which is screw-threaded in a nut or piece of iron E, mortised into the wooden bar C. Near both ends of the bracket-bar C are bolted the sheave-carrying flat springs F F, which overlap or cross each other near the spike-bar A, and extend in opposite directions nearly out to the rollers J, and are offset edgewise, so as to bring the sheaves G G in line with the back of the saw. By this arrangement of the springs it will be seen that I am enabled to use springs of the greatest possible length for the size of the device, which is very desirable, as the length of the springs make a more even pressure against the saw, and also increases greatly the distance that the springs will chase the saw into the tree without moving the bar C forward. Said springs carry pivotally at their free ends grooved sheaves G, in which grooves the rear edge or back of the saw travels, while the springs F press the saw against and into the wood with such force as may be desired and regulated by the set-screw D and moving of the bar C near to or farther from the saw, whereby the springs become more or less bent and their tension thereby changed. The thumb-screw D further serves to adjust the bar C and springs F in chasing the saw step by step across the trunk of a large tree.

H is the saw operating on the tree.

$h$ is the handle.

To support the saw-blade in its proper position to the tree, as shown, I use two supporting-rollers J J, upon which the saw rests and moves. Said rollers are bored axially to receive the rods K K, upon which they revolve freely. The bars K are supported at one end by passing through holes in the bracket-bar C near the end of same. The other ends of the said bars K K are supported by rods or legs L L, driven into the ground with their lower and pointed ends, as shown, while the upper ends are formed into close turned hooks, connected with similar hooks or eyes at the ends of the rods K, thus forming the loose connecting-joints M. Upon the said rods K are further placed the thumb-screwed collars N N, which serve to keep the bar C steady and the rollers J at the desired place upon the bars—namely, near the bar C, wheresoever the latter may be moved to give tension to the springs or chase the saw, as already described.

What I claim as new, and desire to secure by Letters Patent, is—

1. In a device for felling trees, the combination of the spike-bar A, the legs L, and bars K, loosely jointed thereto, with the longitudinally-adjustable rollers J, the thumb-screwed collars N, the adjustable bar C, and the springs F, having the grooved friction rollers or sheaves G, substantially as described, and for the purpose set forth.

2. The combination of the spike-bar A with the adjustable bracket-bar C, and the thumb-screw D, nut E, and the sheave-carrying springs F F, each of which is secured to the said bar C near the one end of it and extends in opposite directions toward and beyond the middle of the said bracket-bar C, substantially as and for the purpose set forth.

In testimony whereof I affix my signature in presence of two witnesses.

PERCY HULL BROWN.

Witnesses:
J. P. WALLS,
*Notary Public, British Columbia.*
RICHARD T. ELLIOTT,
*Victoria, B. C.*